US012573653B2

(12) United States Patent
Okada et al.

(10) Patent No.: US 12,573,653 B2
(45) Date of Patent: Mar. 10, 2026

(54) ELECTROCHEMICAL CELL, POWER GENERATION METHOD USING ELECTROCHEMICAL CELL, AND MANUFACTURING METHOD OF HYDROGEN GAS USING ELECTROCHEMICAL CELL

(71) Applicant: Chiyoda Corporation, Yokohama (JP)

(72) Inventors: Yoshimi Okada, Yokohama (JP); Takuo Yasunishi, Yokohama (JP); Kenichi Imagawa, Yokohama (JP); Daisuke Kurosaki, Yokohama (JP)

(73) Assignee: CHIYODA CORPORATION, Kanagawa (JP)

( * ) Notice: Subject to any disclaimer, the term of this patent is extended or adjusted under 35 U.S.C. 154(b) by 502 days.

(21) Appl. No.: 18/245,827

(22) PCT Filed: Aug. 12, 2021

(86) PCT No.: PCT/JP2021/029742
§ 371 (c)(1),
(2) Date: Mar. 17, 2023

(87) PCT Pub. No.: WO2023/017601
PCT Pub. Date: Feb. 16, 2023

(65) Prior Publication Data
US 2023/0343978 A1 Oct. 26, 2023

(51) Int. Cl.
*H01M 8/10* (2016.01)
*C25B 1/02* (2006.01)
(Continued)

(52) U.S. Cl.
CPC ............. *H01M 8/1246* (2013.01); *C25B 1/02* (2013.01); *C25B 1/042* (2021.01); *C25B 9/05* (2021.01);
(Continued)

(58) Field of Classification Search
None
See application file for complete search history.

(56) References Cited

U.S. PATENT DOCUMENTS 6,264,857 B1 * 7/2001 Kreuer .................... H01M 8/08 429/492
2005/0250001 A1 * 11/2005 Kimura ............... H01M 8/1286 429/492
(Continued)

FOREIGN PATENT DOCUMENTS

CN 105009332 A 10/2015
CN 109761598 A 5/2019
(Continued)

OTHER PUBLICATIONS

Journal of the Gas Turbine Society, vol. 49, No. 2, pp. 1-6 (2021).
(Continued)

*Primary Examiner* — Kendra Ly
(74) *Attorney, Agent, or Firm* — Armstrong Teasdale LLP

(57) ABSTRACT

Provided is an electrochemical cell, a power generation method using the electrochemical cell, and a manufacturing method of a hydrogen gas using the electrochemical cell. A fuel cell 1 (electrochemical cell) includes a proton conductor 5 represented by $(Li, H)_{14-2x}Zn_{1+x}(GeO_4)_4$ where a portion of lithium ions of $Li_{14-2x}Zn_{1+x}(GeO_4)_4$ where x is a number equal to or more than 0 is substituted with protons, the proton conductor having electric conductivity of 0.01 S/cm or more at 300° C., an anode 6 provided on one side of the proton conductor, a cathode 7 provided on another side of the proton conductor, a first separator 9 provided on an anode side of the proton conductor to define an anode chamber 8, and a second separator 12 provided on a cathode side of the proton conductor to define a cathode chamber 11.

22 Claims, 4 Drawing Sheets

(51) Int. Cl.

| | |
|---|---|
| ***C25B 1/042*** | (2021.01) |
| ***C25B 9/05*** | (2021.01) |
| ***C25B 13/07*** | (2021.01) |
| ***H01M 4/92*** | (2006.01) |
| ***H01M 8/0612*** | (2016.01) |
| ***H01M 8/0656*** | (2016.01) |
| ***H01M 8/1213*** | (2016.01) |
| ***H01M 8/1231*** | (2016.01) |
| ***H01M 8/1246*** | (2016.01) |
| *H01M 8/12* | (2016.01) |

(52) U.S. Cl.

CPC ............. *C25B 13/07* (2021.01); *H01M 4/925* (2013.01); *H01M 8/0612* (2013.01); *H01M 8/0656* (2013.01); *H01M 8/1213* (2013.01); *H01M 8/1231* (2016.02); *H01M 2008/1293* (2013.01); *H01M 2300/0074* (2013.01)

(56) References Cited

U.S. PATENT DOCUMENTS

| | | | | |
|---|---|---|---|---|
| 2013/0026409 | A1 | 1/2013 | Baker et al. | |
| 2014/0072836 | A1* | 3/2014 | Mills | H01M 14/00 429/422 |
| 2016/0013513 | A1 | 1/2016 | Fabien | |
| 2020/0112050 | A1 | 4/2020 | Hu et al. | |
| 2020/0388811 | A1 | 12/2020 | Roumi | |

FOREIGN PATENT DOCUMENTS

| | | | |
|---|---|---|---|
| JP | 2005166486 | A | 6/2005 |
| JP | 2008060043 | A | 3/2008 |
| JP | 5897811 | B2 | 3/2016 |

OTHER PUBLICATIONS

Chem. Mater., 2017, 29, 1490-1495.

The Electrochemical Society of Japan, 2018 Autumn Meeting Proceedings, 1B02.

Office Action for Taiwan Patent Application 111110318 received Mar. 8, 2023; 4 pp.

International Search Report for PCT Patent Application PCT/JP2021/029742 mailed Oct. 12, 2021; 2 pp.

Can Cao et al. Recent advances in inorganic solid electrolytes for lithium batteries, Review article, Front. Energy Res., Jun. 27, 2014, Sec. Electrochemical Energy Storage; vol. 2—2014, https://doi.org/10.3389/fenrg.2014.00025; 10 pp.

J. Gopalakrishnan et al. Probing the mobility of lithium in Lisicon: Li1/H1 exchange studies in Li2ZnGeO4 and Li2 +2xZn1—xGeO4, J. Mater. Chem., 2003,13, 1400-1405, https://doi.org/10.1039/B302914J; 6 pp.

Tao Wei et al. Promising Proton Conductor for Intermediate-Temperature Fuel Cells: Li13.9Sr0.1Zn(GeO4)4, Chem. Mater. 2017, 29, 4, 1490-1495, Publication Date: Jan. 27, 2017, https://doi.org/10.1021/acs.chemmater.6b03471; 6 pp.

Superionic conductivity, pp. 738-740; https://home.csulb.edu/~xbu/publications0/B3.pdf avalaible from : https://home.csulb.edu/~xbu/publications0/ published Sep. 17, 2021, by California State University Long Beach.

Office Action for Canada Patent Application No. 3192944 dated May 10, 2024; 5 pp.

* cited by examiner

ELECTROCHEMICAL CELL, POWER GENERATION METHOD USING ELECTROCHEMICAL CELL, AND MANUFACTURING METHOD OF HYDROGEN GAS USING ELECTROCHEMICAL CELL

CROSS-REFERENCE TO RELATED APPLICATION

This application is a U.S. national stage application of PCT/JP2021/029742, filed on Aug. 12, 2021, which is hereby expressly incorporated by reference in its entirety.

TECHNICAL FIELD

The present invention relates to an electrochemical cell, a power generation method using the electrochemical cell, and a manufacturing method of a hydrogen gas using the electrochemical cell.

BACKGROUND ART

A polymer electrolyte fuel cell (PEFC) used for automobiles, a phosphoric acid fuel cell (PAFC) used as a stationary fuel cell, a molten carbonate fuel cell (MCFC), and a solid oxide fuel cell (SOFC) have been put to practical use. An operation temperature of the polymer electrolyte fuel cell is between normal temperature and 100° C., an operation temperature of the phosphoric acid fuel cell is between 180° C. and 200° C., an operation temperature of the molten carbonate fuel cell is between 600° C. and 700° C., and an operation temperature of the solid oxide fuel cell is between 600° C. and 900° C. However, there is no fuel cell that operates in a medium temperature range between 200° C. and 600° C.

The fuel cell that operates in the medium temperature range between 200° C. and 600° C. is suitable not only for a hydrogen-oxygen fuel cell but also for a direct type fuel cell that generates hydrogen from various fuels in a fuel electrode room of the fuel cell, and generates electricity by a fuel cell reaction using the generated hydrogen. Further, the fuel cell that operates in the medium temperature range between 200° C. and 600° C. can promote the fuel cell reaction as compared with a fuel cell that operates in a low temperature range of 200° C. or less, thereby improving efficiency.

There is no fuel cell that operates in the medium temperature range between 200° C. and 600° C. because there is no ionic conductor having sufficient ionic conductivity in this temperature range. So far, cesium dihydrogen phosphate ($CsH_2PO_4$), which was discovered in 1997, has attracted attention as a proton conductor having the highest electric conductivity. However, the cesium dihydrogen phosphate undergoes a phase transition at 270° C. or higher, so that the use limit temperature of the cesium dihydrogen phosphate is set to 270° C. The cesium dihydrogen phosphate usually has an operation temperature of 250° C., and an electric conductivity σ (S/cm) at this temperature is about 0.008. Accordingly, realization of a fuel cell that operates in the medium temperature range has been an important research topic since the 1990s.

Patent Document 1 discloses a direct type fuel cell. The direct type fuel cell supplies its cells with an organic hydride compound such as methylcyclohexane and decalin as fuel, and causes a dehydrogenation reaction by causing the organic hydride compound to come in contact with a noble metal catalyst fixed to an electrode of a fuel electrode.

As a dehydrogenation catalyst that promotes a dehydrogenation reaction for forming hydrogen from methylcyclohexane, a platinum alumina catalyst of Patent Document 2 developed by Chiyoda Corporation can be used. Non-Patent Document 1 indicates that the demonstration of the whole system of a large-scale hydrogen supply chain by an organic chemical hydride method using the dehydrogenation catalyst has been completed internationally, and is moving to a commercialization stage. This dehydrogenation catalyst has a high yield and lifetime that can be used at an industrial level, and is primarily used for generating hydrogen from methylcyclohexane by a dehydrogenation reaction at the place of utilization. At this time, since the dehydrogenation reaction is an endothermic reaction, a heat source is required, so that the cost of the heat source may be high. Further, in a case where the heat source is fossil fuel, $CO_2$ generated from the heat source may lower life cycle assessment $CO_2$ (LCA $CO_2$).

In Patent Document 1, the hydrogen generated at the fuel electrode delivers an electron to the fuel electrode and thus becomes a proton. The proton moves in an electrolyte membrane, and receives the electron from an electrode together with an oxygen atom activated at a counter air electrode to promote a fuel cell reaction. The electrolyte membrane is a membrane made of a mixture of a microcrystal of cesium dihydrogen phosphate ($CsH_2SO_4$) and polytetrafluoroethylene. The direct type fuel cell of Patent Document 1 has an output of 40 $mW/cm^2$ at the operation temperature between 170° C. and 220° C.

However, when a solid electrolyte as an organic film is used, the operation temperature is generally 100° C. or less. If the operation temperature is 200° C. or more, the heat resistance of the organic film is not sufficient. The cesium dihydrogen phosphate is known as a solid electrolyte that can be used at 200° C. or higher. However, since the use limit temperature of the cesium dihydrogen phosphate is 270° C., there is a demand for a new proton conductor that can be used at even higher temperature.

In response to such a demand, Non-Patent Document 2 discloses $Li_{1.39}Sr_{0.1}Zn\ (GeO_4)_4$ where a portion of Li of $Li_{14}Zn\ (GeO_4)_4$, which is a kind of LISICON as a solid electrolyte, is substituted with Sr. $Li_{13.9}Sr_{0.1}Zn\ (GeO_4)_4$ demonstrates electric conductivity of 0.039 S/cm at 600° C., and has electric conductivity higher than a solid electrolyte of conventional zirconia-based or ceria-based materials. Further, the fuel cell to which $Li_{13.9}Sr_{0.1}Zn\ (GeO_4)_4$ is applied has an output of about 0.4 $W/cm^2$ at the operation temperature of 600° C. Further, if movable lithium ions are completely substituted with protons in $Li_{13.9}Sr_{0.1}Zn\ (GeO_4)_4$, the electric conductivity at the operation temperature of 600° C. improves to 0.048 S/cm. The lithium ions are exchanged with the protons in water or dilute acetic acid. As an example, the lithium ions are exchanged by stirring $Li_{13.9}Sr_{0.1}Zn\ (GeO_4)_4$ in an acetic aqueous solution of 5 mM for 24 hours.

Non-Patent Document 3 discloses a proton conductor where an ion exchange treatment is applied to $Li_{14-2x}Zn_{1+x}\ (GeO_4)_4$ in an acetic aqueous solution of 5 mM to exchange lithium ions with protons. Non-Patent Document 3 applies the ion exchange treatment to $Li_{14}Zn\ (GeO_4)_4$, $Li_{12}Zn_2\ (GeO_4)_4$, and $Li_{10}Zn_3\ (GeO_4)_4$ with a varied $Li^+/Zn^{2+}$ ratio, identifies each sample, and measures the weight change during a rise in temperature, thereby confirming that the more lithium is contained in a sample, the greater an amount of the lithium ions exchanged with the protons. Further, Non-Patent Document 3 finds the possibility of obtaining the same electric conductivity as the proton conductor disclosed in Non-Patent Document 2 from the result of the electromotive force measurement of a hydrogen concentration cell using a proton conductor.

PRIOR ART DOCUMENT(S)

Patent Document(s)

Patent Document 1: JP2005-166486A
Patent Document 2: JP5897811B2
Non-Patent Document 1: Journal of the Gas Turbine Society, Vol. 49, No. 2, Pages 1-6 (2021)
Non-Patent Document 2: Chem. Mater., 2017, 29, 1490-1495
Non-Patent Document 3: The Electrochemical Society of Japan, 2018 Autumn Meeting Proceedings, 1B02

SUMMARY OF THE INVENTION

Task to be Accomplished by the Invention

However, in the temperature range between 200° C. and 600° C., a new proton conductor with higher electric conductivity is desired. An electrochemical cell using such a proton conductor as a solid electrolyte can set the operation temperature between 200° C. and 600° C., and promote the dehydrogenation reaction of an organic hydride compound in a fuel electrode. Moreover, an electrolytic cell using such a proton conductor as a solid electrolyte can set the operation temperature between 200° C. and 600° C., and improve the efficiency of the electrolytic reaction.

Thus, an object of the present invention is to provide an electrochemical cell, a power generation method using the electrochemical cell, and a manufacturing method of a hydrogen gas using the electrochemical cell that are suitable for the use in a temperature range between 200° C. and 600° C.

Means to Accomplish the Task

To achieve such an object, one aspect of the present invention provides an electrochemical cell (1), comprising: a proton conductor (5) represented by $(Li, H)_{14-2x}Zn_{1+x}(GeO_4)_4$ where a portion of lithium ions of $Li_{14-2x}Zn_{1+x}(GeO_4)_4$ where x is a number equal to or more than 0 is substituted with protons, the proton conductor having electric conductivity of 0.01 S/cm or more at 300° C.; an anode (6) provided on one side of the proton conductor; a cathode (7) provided on another side of the proton conductor; a first separator (9) provided on an anode side of the proton conductor to define an anode chamber (8); and a second separator (12) provided on a cathode side of the proton conductor to define a cathode chamber (11). The x may contain decimals. $Li_{14-2x}Zn_{1+x}(GeO_4)_4$ can also be represented by $Li_{2+2y}Zn_{1-y}GeO_4$. Regarding these formulae, "$x=3-4y$" is satisfied. A structure where a portion of the lithium ions of $Li_{14-2x}Zn_{1+x}(GeO_4)_4$ is substituted with the protons can be expressed as $(Li, H)_{14-2x}Zn_{1+x}(GeO_4)_4$ or $(Li, H)_{2+2y}Zn_{1-y}GeO_4$.

According to this aspect, an electrochemical cell suitable for the use in the temperature range between 200° C. and 600° C. can be provided. The electrochemical cell can be used as a fuel cell and an electrolytic cell.

In the above aspect, preferably, the electrochemical cell further comprises a temperature adjustor configured to maintain a temperature of the proton conductor between 200° C. and 600° C. inclusive.

According to this aspect, the electric conductivity of the proton conductor can be maintained at a high level.

In the above aspect, preferably, the x is 0.

In the above aspect, preferably, 40% to 70% inclusive of movable lithium ions contained in $Li_{14-2x}Zn_{1+x}(GeO_4)_4$ are substituted with the protons. Further, in the above aspect, preferably, 50% to 60% inclusive of movable lithium ions contained in $Li_{14-2x}Zn_{1+x}(GeO_4)_4$ are substituted with the protons. The movable lithium ions are lithium ions that are included in all the lithium ions in $Li_{14-2x}Zn_{1+x}(GeO_4)_4$ and can move in $Li_{14-2x}Zn_{1+x}(GeO_4)_4$. The ratio of the movable lithium ions to all the lithium ions in $Li_{14-2x}Zn_{1+x}(GeO_4)_4$ is $(3-x)$ to $(14-2x)$.

According to these aspects, the electric conductivity of the proton conductor can be improved.

In the above aspect, preferably, the electrochemical cell comprises a plurality of cells (2) each including the proton conductor, the anode, the cathode, the first separator, and the second separator, wherein the first separator of one of the plurality of cells is in contact with the second separator of another of the plurality of cells so as to exchange heat.

According to this aspect, the heat generated by the reaction of the protons and oxygen at the cathode is transferred to the anode through the first separator and the second separator. Accordingly, the temperature of the proton conductor is more likely to be maintained between 200° C. and 600° C.

In the above aspect, preferably, hydrogen is supplied to the anode chamber, air is supplied to the cathode chamber, and an electromotive force is generated between the anode and the cathode, and the electrochemical cell functions as a hydrogen-oxygen fuel cell.

According to this aspect, a hydrogen-oxygen fuel cell can be provided.

In the above aspect, preferably, a hydrogen-containing compound containing hydrogen is supplied to the anode chamber, air is supplied to the cathode chamber, a catalyst layer containing a catalyst configured to generate a hydrogen gas from the hydrogen-containing compound is provided in the anode chamber, and an electromotive force is generated between the anode and the cathode, and the electrochemical cell functions as a hydrogen-oxygen fuel cell.

According to this aspect, a direct type fuel cell can be provided.

In the above aspect, preferably, the hydrogen-containing compound is an organic hydride compound where an aromatic having 1-3 rings is hydrogenated. Further, preferably, the hydrogen-containing compound includes at least one selected from a group consisting of methylcyclohexane, cyclohexane, trimethylcyclohexane, decalin, benzyltoluene, and dibenzotriol.

According to this aspect, a direct type fuel cell in which the fuel supplied to the anode is an organic hydride compound can be provided. Further, the reaction heat required for an endothermic reaction to generate hydrogen from the fuel can be compensated by the heat generated by a fuel cell reaction, which is an exothermic reaction to generate water.

The hydrogen generated by the dehydrogenation reaction by the dehydrogenation catalyst delivers electrons to the anode in the anode chamber, and thus becomes the protons. The protons travel inside the proton conductor, and reach the cathode of the opposite electrode. At this time, the fuel cell reaction is caused to form water by the protons with oxygen ions that have received the electrons at the cathode. Accordingly, the electrons flow through the circuit, so that electricity is generated. The dehydrogenation reaction is an equilibrium reaction regulated by the chemical equilibrium. For example, in a case of the dehydrogenation reaction of methylcyclohexane, at normal reaction pressure in a normal reactor, a reaction temperature of 320° C. is required to cause the dehydrogenation reaction of nearly 100%. In the electrochemical cell, the protons are removed to the opposite electrode by the proton conductor, which shifts the chemical equilibrium to a lower temperature. Accordingly, almost 100% of the dehydrogenation reaction can be caused even at 320° C. or lower. Furthermore, the dehydrogenation reaction can be promoted by increasing the operation temperature.

In the above aspect, preferably, the hydrogen-containing compound includes at least one selected from a group consisting of ammonia, formic acid, methanol, and dimethyl ether.

In the above aspect, preferably, the catalyst is a dehydrogenation catalyst including an alumina carrier and platinum carried by the alumina carrier, and an average particle diameter of the platinum is 2 nm or less.

According to this aspect, the dehydrogenation reaction of methylcyclohexane at the anode can be promoted. The hydrogen formed by the dehydrogenation reaction in the anode chamber delivers electrons to an anode electrode, becomes the protons, and passes through the proton conductor. Accordingly, the hydrogen formed by the dehydrogenation reaction is removed, so that the chemical equilibrium shifts to a lower temperature and the dehydrogenation reaction is promoted.

As the dehydrogenation catalyst, a platinum carrying alumina catalyst developed by Chiyoda Corporation can be used. This is a catalyst in which platinum particles are highly dispersed on a surface of porous γ-alumina used as a catalyst carrier. The platinum carrying alumina catalyst has long been used in many reactions. The platinum particles of the conventional platinum carrying alumina catalyst are large, and even the smallest platinum particle is 2 nm or more, so that the average particle diameter is also 2 nm or more. If the dehydrogenation reaction of organic hydride is caused by such a conventional platinum catalyst, a decomposition reaction is caused on the platinum particles, and a carbon deposition reaction in which carbonaceous materials cover the active points by detoxifying the surface of the platinum particles is remarkably likely to occur. The lifetime of such a catalyst is only a few days because the active points of the platinum particles are rapidly decreased. In the catalyst developed by Chiyoda Corporation, most of the platinum particles have a diameter of about 1 nm, the average particle diameter is 2 nm or less, and the platinum particles are highly dispersed on the surface of the alumina carrier. Accordingly, the catalyst developed by Chiyoda Corporation can be used industrially for more than one year continuously while suppressing the carbon deposition reaction. The catalyst is developed, ahead of other companies in the world, by Chiyoda Corporation as a dehydrogenation catalyst for the organic hydride, and can be used as the dehydrogenation catalyst for the dehydrogenation reaction of organic hydride according to the present invention.

In the above aspect, preferably, water vapor is supplied to the anode chamber, a DC power supply is connected between the anode and the cathode, and the electrochemical cell functions as an electrolytic cell to form hydrogen at the cathode. In this aspect, no raw material needs to be supplied to the cathode chamber.

According to this aspect, the electrolytic cell suitable for the use in the temperature range between 200° C. and 600° C. can be provided.

Another aspect of the present invention provides a power generation method using the electrochemical cell, comprising: supplying hydrogen to the anode chamber; supplying air to the cathode chamber; and maintaining a temperature of the proton conductor between 200° C. and 600° C. inclusive.

According to this aspect, by using the electrochemical cell, electricity can be generated from hydrogen as fuel.

Another aspect of the present invention provides a power generation method using the electrochemical cell, comprising: providing a catalyst layer in the anode chamber, the catalyst layer being configured to generate a hydrogen gas from a hydrogen-containing compound; supplying the hydrogen-containing compound to the anode chamber; supplying air to the cathode chamber; and maintaining a temperature of the proton conductor between 200° C. and 600° C. inclusive.

According to this aspect, by using the electrochemical cell, electricity can be generated from the hydrogen-containing compound as fuel.

In the above aspect, preferably, the hydrogen-containing compound is an organic hydride compound where an aromatic having 1-3 rings is hydrogenated. Further, preferably, the hydrogen-containing compound includes at least one selected from a group consisting of methylcyclohexane, cyclohexane, trimethylcyclohexane, decalin, benzyltoluene, and dibenzotriol. Further, preferably, the hydrogen-containing compound includes at least one selected from a group consisting of ammonia, formic acid, methanol, and dimethyl ether.

In the above aspect, preferably, the catalyst layer includes a dehydrogenation catalyst including an alumina carrier and platinum carried by the alumina carrier, and an average particle diameter of the platinum is 2 nm or less.

According to this aspect, the dehydrogenation reaction of methylcyclohexane at the anode can be promoted.

Another aspect of the present invention provides a manufacturing method of a hydrogen gas by electrolysis using the electrochemical cell, comprising: supplying water vapor to the anode chamber; supplying water to the cathode chamber; maintaining a temperature of the proton conductor between 200° C. and 600° C. inclusive; and applying a DC voltage between the anode and the cathode and generating a hydrogen gas at the cathode. In this aspect, no raw material needs to be supplied to the cathode chamber.

According to this aspect, hydrogen can be formed by using the electrochemical cell.

Another aspect of the present invention provides a manufacturing method of a hydrogen gas by electrolysis using the electrochemical cell, comprising: providing a catalyst in the anode chamber; supplying the anode chamber with ammonia or at least one hydrocarbon selected from a group including methylcyclohexane, formic acid, methanol, and dimethyl ether; maintaining a temperature of the proton conductor between 200° C. and 600° C. inclusive; applying a DC voltage between the anode and the cathode; and generating the protons from the ammonia or the hydrocarbon by the catalyst in the anode chamber, moving the protons to the cathode through the proton conductor, and generating a hydrogen gas at the cathode. In this aspect, no raw material needs to be supplied to the cathode chamber.

According to this aspect, hydrogen can be produced by using the electrochemical cell.

Another aspect of the present invention provides a manufacturing method of a hydrogen gas by electrolysis using the electrochemical cell, comprising: performing the electrolysis in a pressurized condition.

According to this aspect, a high-pressure hydrogen gas can be formed.

EFFECT OF THE INVENTION

According to the above aspects, it is possible to provide an electrochemical cell, a power generation method using the electrochemical cell, and a manufacturing method of a hydrogen gas using the electrochemical cell that are suitable for the use in a temperature range between 200° C. and 600° C.

MODE(S) FOR CARRYING OUT THE INVENTION

The First Embodiment

Figure 1:
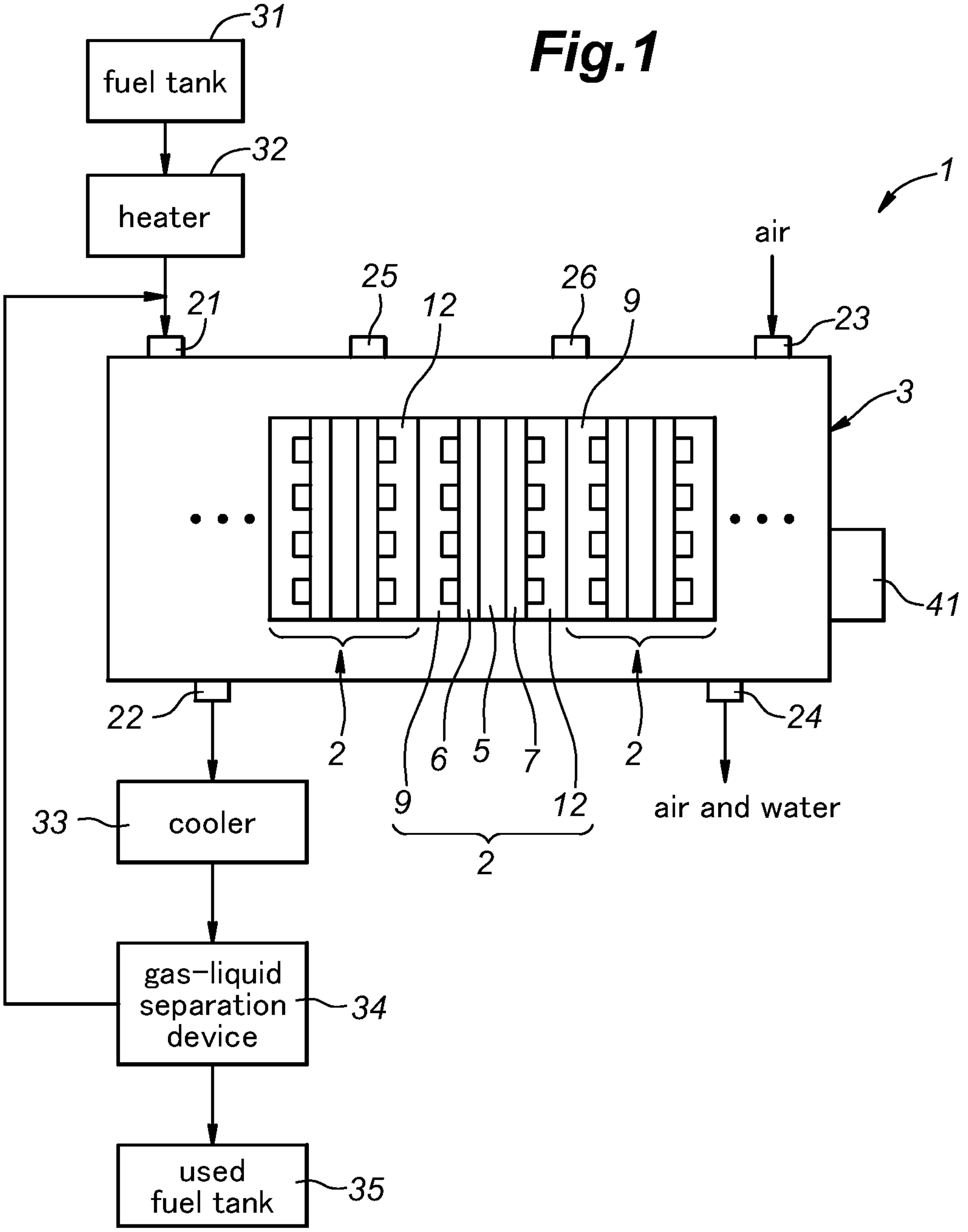
FIG. 1 is a structural diagram of a fuel cell.
Figure 2:
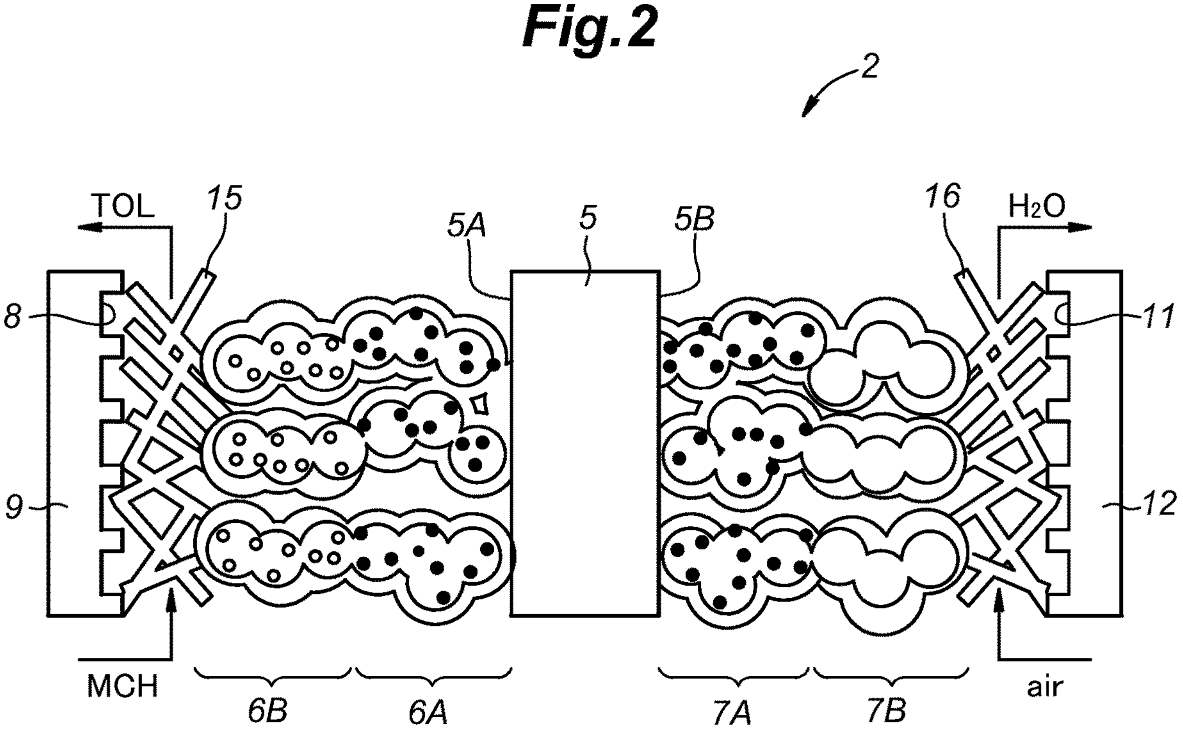
FIG. 2 is a structural diagram of a power generation cell.

In the following, embodiments of an electrochemical cell according to the present invention will be described. The first embodiment describes an example in which the electrochemical cell according to the present invention is applied to a fuel cell. As shown in FIG. 1, the fuel cell 1 includes a fuel cell stack 3 including a plurality of power generation cells 2 stacked with each other. As shown in FIGS. 1 and 2, each power generation cell 2 includes a proton conductor 5, an anode 6 provided on one side of the proton conductor 5, a cathode 7 provided on another side of the proton conductor 5, a first separator 9 provided on an anode side (a side of the anode 6) of the proton conductor 5 to define an anode chamber 8, and a second separator 12 provided on a cathode side (a side of the cathode 7) of the proton conductor 5 to define a cathode chamber 11.

In the present embodiment, a hydrogen-containing compound containing hydrogen is supplied to the anode chamber 8, and air is supplied to the cathode chamber 11. The hydrogen-containing compound may be an organic hydride compound where an aromatic having 1-3 rings is hydrogenated. The hydrogen-containing compound may include at least one selected from a group consisting of methylcyclohexane, cyclohexane, trimethylcyclohexane, decalin, benzyltoluene, and dibenzotriol. Further, the hydrogen-containing compound may include at least one selected from a group consisting of ammonia, formic acid, methanol, and dimethyl ether. In the present embodiment, the hydrogen-containing compound as fuel is methylcyclohexane (MCH). The anode 6 may be referred to as a fuel electrode, the cathode 7 may be referred to as an air electrode, the anode chamber 8 may be referred to as a fuel passage, and the cathode chamber 11 may be referred to as an air passage.

The proton conductor 5 is formed in a film shape. The proton conductor 5 has a structure in which a portion of Li of $Li_{14-2x}Zn_{1+x}(GeO_4)_4$ is substituted with protons. In the above formula, "x" is a number equal to or more than 0, and may include decimals. $Li_{14-2x}Zn_{1+x}(GeO_4)_4$ can be represented by $Li_{2+2y}Zn_{1-y}GeO_4$. Regarding these formulae, "x=3−4y" is satisfied. A structure where a portion of the lithium ions of $Li_{14-2x}Zn_{1+x}(GeO_4)_4$ is substituted with the protons can be expressed as $(Li, H)_{14-2x}Zn_{1+x}(GeO_4)_4$ or $(Li, H)_{2+2y}Zn_{1-y}GeO_4$. $Li_{14-2x}Zn_{1+x}(GeO_4)_4$ is a kind of a lithium super ionic conductor (LISICON) that is a solid electrolyte. The "x" may be 0, 1, or 2, for example.

LISICON has a framework structure formed by tetrahedrons of $LiO_4$, $GeO_4$, $SiO_4$, $PO_4$, $ZnO_4$, and $VO_4$ of $\gamma$-$Li_3PO_4$ type and octahedrons of $LiO_6$. $Li_{14}Zn(GeO_4)_4$ is a solid solution where Zn is dissolved in $Li_4GeO_4$ as a matrix, and has high conductivity.

The proton conductor 5 has electric conductivity of 0.01 S/cm or more at 300° C. In the proton conductor 5, 40% to 70% inclusive of movable lithium ions contained in $Li_{14-2x}Zn_{1+x}(GeO_4)_4$ are substituted with the protons. Moreover, in the proton conductor 5, 50% to 60% inclusive of the movable lithium ions contained in $Li_{14-2x}Zn_{1+x}(GeO_4)_4$ may be substituted with the protons. In the proton conductor 5, 40% to 70% inclusive of the movable lithium ions contained in $Li_{14}Zn(GeO_4)_4$ may be substituted with the protons. Moreover, in the proton conductor 5, 50% to 60% inclusive of the movable lithium ions contained in $Li_{14}Zn(GeO_4)_4$ may be substituted with the protons.

In the following, a manufacturing method of the proton conductor 5 will be described. First, a preparing method of $Li_{14-2x}Zn_{1+x}(GeO_4)_4$ before ion exchange will be described. A preparing method of $Li_{14-2x}Zn_{1+x}(GeO_4)_4$ is also disclosed in Non-Patent Document 3 described above. $Li_{14-2x}Zn_{1+x}(GeO_4)_4$ can be prepared by a solid phase method. Reagent powders of "Li source", "Zn source", and "Ge source" are mixed overnight in an organic solvent, and then pulverized. Thereafter, the organic solvent is evaporated to acquire a mixture. The Li source may contain at least one selected from a group including LiOH, $Li_2O$, and $LiNO_3$. The Zn source may contain at least one selected from a group including $Zn(OH)_2$, $ZnCO_3$, and $Zn(NO_3)_2$. The Ge source may contain at least one selected from a group including GeO and $GeCl_2$. The combination of the Li source, the Zn source, and the Ge source may be, for example, $Li_2CO_3$, ZnO, and $GeO_2$. The organic solvent may be at least one selected from a group including ethanol, methanol, 1-propanol, 2-propanol, and 1-butanol. Thereafter, the mixture is molded into pellets using a molding machine, and the molded articles are fired in air. Thereafter, the molded articles are pulverized into a powder to acquire $Li_{14-2x}Zn_{1+x}(GeO_4)_4$.

The firing temperature in air of the molded articles may be 1000° C. to 1200° C., and preferably, 1100° C. to 1150° C. If the firing temperature is lower than 1000° C., a solid phase reaction may not proceed well. If the firing temperature is higher than 1200° C., the molded articles may be melted. The firing time of the molded articles may be 3 to 7 hours, and preferably, 4 to 6 hours. The molded articles may be fired in air, for example, at 1150° C. for 5 hours.

$Li_{14-2x}Zn_{1+x}(GeO_4)_4$ may be $Li_{14}Zn(GeO_4)_4$, $Li_{12}Zn_2(GeO_4)_4$, or $Li_{10}Zn_3(GeO_4)_4$, for example. The ratio of Li to Zn in $Li_{14-2x}Zn_{1+x}(GeO_4)_4$ can be varied according to the ratio of the Li source, the Zn source, and the Ge source to be mixed.

Next, a method of substituting a portion of the lithium ions of $Li_{14-2x}Zn_{1+x}(GeO_4)_4$ with the protons will be described. A portion of the movable lithium ions included in $Li_{14-2x}Zn_{1+x}(GeO_4)_4$ is substituted with the protons by immersing a powder sample of $Li_{14-2x}Zn_{1+x}(GeO_4)_4$ in a non-aqueous solvent containing an acid, and stirring the powder sample and the non-aqueous solvent. The non-aqueous solvent may be a non-protic solvent. The non-aqueous solvent may contain one selected from a group including toluene, dimethylsulfoxide, tetrahydrofuran, and N, N-dimethylformamide. The acid may contain at least one selected from a group including benzoic acid, m-nitrophenol, acetic acid, p-toluenesulfonic acid, oxalic acid, and methanesulfonic acid. For example, toluene from which water is removed by using a dehydrating agent may be used as the non-aqueous solvent, and $Li_{14-2x}Zn_{1+x}(GeO_4)_4$ may be stirred for 24 hours in 100 mL of a non-aqueous organic solution in which benzoic acid is dissolved at the concentration of 5 mM as a proton source, thereby performing ion exchange.

An ion exchange rate of the movable lithium ions contained in $Li_{14-2x}Zn_{1+x}(GeO_4)_4$ to the protons can be adjusted by changing the concentration of $Li_{14-2x}Zn_{1+x}(GeO_4)_4$ in the solvent and the species of the acid. If the solvent is aqueous and the species of the acid is acetic acid, it is confirmed that the ion exchange rate of the movable lithium ions contained in $Li_{14-2x}Zn_{1+x}(GeO_4)_4$ to the protons reaches 100%.

The powder of the proton conductor after ion exchange can be acquired by removing the solvent. A drying temperature at this time may be between the boiling point of the used solvent and 300° C. inclusive. If the drying temperature is lower than the boiling point, the solvent may remain. If the drying temperature is higher than 300° C., the protons in the sample may be desorbed. According to the above range, a powdery proton conductor can be acquired. The powdery proton conductor can be formed into a film shape by, for example, a molding machine. Further, the powdery proton conductor may be molded by using a wet method or a dry method such as vapor deposition.

As shown in FIG. 2, the anode 6 includes an anode catalyst layer 6A stacked on a first surface 5A of the proton conductor 5, and an anode gas diffusion layer 6B stacked on a side of the anode catalyst layer 6A opposite to the proton conductor 5. The cathode 7 includes a cathode catalyst layer 7A stacked on a second surface 5B of the proton conductor 5 opposite to the first surface 5A, and a cathode gas diffusion layer 7B stacked on a side of the cathode catalyst layer 7A opposite to the proton conductor 5.

The anode catalyst layer 6A and the cathode catalyst layer 7A each include a conductive porous support and an electrode catalyst supported by the support. The support is, for example, an ionomer. As the above electrode catalyst, an electrode catalyst used in a known PEFC can be used. The electrode catalyst can be, for example, a noble metal catalyst such as platinum, palladium, iridium, ruthenium. Alternatively, the electrode catalyst may be an inexpensive metal catalyst.

The anode gas diffusion layer 6B and the cathode gas diffusion layer 7B are made of porous bodies, and reactive gases diffuse therein. The anode gas diffusion layer 6B and the cathode gas diffusion layer 7B may be made of, for example, a metal porous material or a nonwoven fabric of a carbon fiber. In the present embodiment, the anode gas diffusion layer 6B and the cathode gas diffusion layer 7B have electrical conductivity.

A dehydrogenation catalyst is coupled to at least one of the anode gas diffusion layer 6B and the anode catalyst layer 6A. The dehydrogenation catalyst may preferably be a platinum carrying alumina catalyst used for an organic chemical hydride method. The platinum carrying alumina catalyst includes an alumina carrier and platinum as an active metal carried by the alumina carrier. Platinum is formed into particles, and dispersedly carried by the alumina carrier. The platinum carrying alumina catalyst has activity with respect to the dehydrogenation reaction of a hydrogenated aromatic such as methylcyclohexane.

The average particle diameter of the platinum particles may be 2 nm or less, preferably between 0.5 nm and 2.0 nm inclusive, more preferably between 0.8 nm and 1.5 nm inclusive. Further, the size of 70% or more of the platinum particles may be 2 nm or less, preferably between 0.5 nm and 2.0 nm inclusive, and more preferably between 0.8 nm and 1.5 nm inclusive. The average particle diameter and size of the platinum particles may be measured by a transmission electron microscopy. The platinum particles may be carried by the alumina carrier as platinum element (Pt) in a range between 0.1 wt. % and 1.5 wt. % inclusive.

The alumina carrier may include an r-alumina carrier. The surface area of the r-alumina carrier may be 200 $m^2/g$ or more, a pore volume of the r-alumina carrier may be 0.50 $m^2/g$ or more, an average pore diameter of the r-alumina carrier may be in a range of 60 Å to 150 Å, and a ratio of a volume of pores having a diameter within ±30 Å of the average pore diameter to the total pore volume may be 60% or more.

The platinum carrying alumina catalyst as the dehydrogenation catalyst may have a second component together with the platinum particles. The second component may be at least one selected from a group consisting of alkali metal such as sodium and potassium, vanadium, molybdenum, chromium, sulfur, and phosphorus. The second component may be carried by the alumina carrier in a range of 0.5 wt. % to 1.5 wt. %. For example, the alumina carrier may contain sulfur or a sulfur compound in a range between 0.5 wt. % and 1.2 wt. % inclusive as elemental sulfur (S). Further, the alumina carrier may carry alkali metal in a range between 0.5 wt. % and 1.5 wt. % inclusive. The second component increases the selectivity of the platinum carrying alumina catalyst, thereby extending the life of the catalyst.

The dehydrogenation catalyst may be provided in the anode gas diffusion layer 6B in various known forms. For example, the dehydrogenation catalyst may be formed into a power, and the powdery dehydrogenation catalyst may be fixed to a structure forming the anode gas diffusion layer 6B. Further, the anode gas diffusion layer 6B may be formed by pulverizing the dehydrogenation catalyst and molding the pulverized dehydrogenation catalyst. The dehydrogenation catalyst may be provided in the anode catalyst layer 6A.

The first separator 9 defines the anode chamber 8 between the first separator 9 and the anode gas diffusion layer 6B. A plurality of grooves forming the anode chamber 8 may be provided on an anode gas diffusion layer side (a side of the anode gas diffusion layer 6B) of the first separator 9. A spacer 15 may be provided between the first separator 9 and the anode gas diffusion layer 6B to expand the anode chamber 8. In another embodiment, the spacer 15 may be omitted, and the first separator 9 and the anode gas diffusion layer 6B may be in direct contact with each other.

The second separator 12 defines the cathode chamber 11 between the second separator 12 and the cathode gas diffusion layer 7B. A plurality of grooves forming the cathode chamber 11 may be provided on a cathode gas diffusion layer side (a side of the cathode gas diffusion layer 7B) of the second separator 12. A spacer 16 may be provided between the second separator 12 and the cathode gas diffusion layer 7B to expand the cathode chamber 11. In another embodiment, the spacer 16 may be omitted, and the second separator 12 and the cathode gas diffusion layer 7B may be in direct contact with each other.

The first separator 9 and the second separator 12 are made of heat conductors. Further, in the present embodiment, the first separator 9 and the second separator 12 are made of electrical conductors. The first separator 9 and the second separator 12 may be made of metal such as stainless steel, carbon, or a carbon resin composite, for example. The first separator 9 is electrically connected with the anode 6, and the second separator 12 is electrically connected with the cathode 7.

An inlet of the anode chamber 8 of each power generation cell 2 is connected to a common fuel inlet 21. An outlet of the anode chamber 8 of each power generation cell 2 is connected to a common fuel outlet 22. An inlet of the cathode chamber 11 of each power generation cell 2 is connected to a common air inlet 23. An outlet of the cathode chamber 11 of each power generation cell 2 is connected to a common air outlet 24.

The power generation cells 2 are stacked with each other. The first separator 9 of one of the power generation cells 2 is in contact with the second separator 12 of another of the power generation cells 2 so as to exchange heat. The first separator 9 and the second separator 12 of the power generation cells 2 adjacent to each other may be formed integrally. As the first separator 9 and the second separator 12 are in contact with each other, the adjacent power generation cells 2 are electrically connected in series. The first separator 9 arranged at one end of the stacked power generation cells 2 is connected to a negative electrode 25 of the fuel cell stack 3. The second separator 12 arranged at another end of the stacked power generation cells 2 is connected to a positive electrode 26 of the fuel cell stack 3. An external load is connected to the negative electrode 25 and the positive electrode 26.

The fuel inlet 21 is connected to a fuel tank 31 via a heater 32. The heater 32 heats and vaporizes liquid methylcyclohexane supplied from the fuel tank 31. The heater 32 may be an electric heater that has a power line that generates heat by electricity, or a heater that uses combustion heat of fossil fuel as a heat source. The methylcyclohexane vaporized by the heater 32 is supplied to the fuel inlet 21.

The fuel outlet 22 is connected to a used fuel tank 35 via a cooler 33 and a gas-liquid separation device 34. The cooler 33 cools an exhaust gas discharged from the fuel outlet 22. The exhaust gas mainly contains toluene and hydrogen formed from methylcyclohexane and unreacted methylcyclohexane. The cooler 33 liquefies toluene and methylcyclohexane in the exhaust gas. The cooler 33 cools the exhaust gas to 110.6° C., which is the boiling point of toluene, or lower. The cooler 33 and the heater 32 may include heat exchangers that cause the fuel and the exhaust gas to exchange heat. The cooler 33 may include an air-cooled heat exchanger or a water-cooled heat exchanger.

The gas-liquid separation device 34 separates liquid toluene and methylcyclohexane from the exhaust gas. The separated toluene and methylcyclohexane are stored in the used fuel tank 35. The gaseous component of the exhaust gas from which liquid toluene and methylcyclohexane have been separated is mainly hydrogen. This gaseous component of the exhaust gas may be sent via pipes from the gas-liquid separation device 34 to the fuel inlet 21 of the fuel cell stack 3.

The inlet of the cathode chamber 11 is connected to an intake pipe that takes in air. The outlet of the cathode chamber 11 is connected to a discharge pipe that discharges air and water to the outside.

The fuel cell 1 may include a temperature adjustor configured to maintain the temperature of the proton conductor 5 between 200° C. and 600° C. inclusive. The temperature adjustor may maintain the temperature of the proton conductor 5 between 250° C. and 600° C. inclusive. The temperature adjustor may be the heater 32 that adjusts the temperature of methylcyclohexane supplied to the anode chamber 8. Alternatively, the temperature adjuster may be a temperature adjusting device 41 including an air-cooling device that cools the fuel cell stack 3 by outside air or a water-cooling device that cools the fuel cell stack 3 with cooling water. Alternatively, the temperature adjustor may be a flow rate control valve that regulates the flow rate of methylcyclohexane supplied to the anode chamber 8. The power generation method using the fuel cell 1 includes a process of maintaining the temperature of the proton conductor 5 between 200° C. and 600° C. inclusive. The temperature of the fuel cell 1 may be maintained between 200° C. and 600° C. inclusive by the temperature adjustor.

Next, the operation of the fuel cell 1 having the above configuration will be described. Methylcyclohexane is supplied from the fuel tank 31 to the anode chamber 8 of each power generation cell 2 of the fuel cell 1 via the fuel inlet 21. The methylcyclohexane is supplied to the anode chamber 8 after being heated and vaporized by the heater 32. Air containing oxygen as an oxidant is supplied to the cathode chamber 11 of each power generation cell 2 of the fuel cell 1 via the air inlet 23.

The methylcyclohexane supplied to the anode chamber 8 diffuses into the anode gas diffusion layer 6B. In the anode gas diffusion layer 6B provided with the dehydrogenation catalyst, methylcyclohexane is decomposed into hydrogen and toluene by the dehydrogenation reaction represented by the following reaction formula (1).

(1)

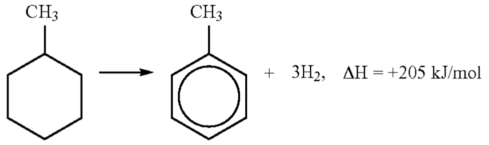

This reaction is an endothermic reaction. The temperature of the anode chamber 8 is maintained between 200° C. and 600° C. by using reaction heat of a cathode reaction (the reaction formula (3)) that will be described later.

The hydrogen formed by the dehydrogenation reaction releases electrons and forms the protons in the anode catalyst layer 6A by an anode reaction represented by the following reaction formula (2) in the presence of the electrode catalyst.

$$H_2 \rightarrow 2H^+ + 2e^- \quad (2)$$

The protons formed in the anode catalyst layer 6A pass through an inside of the proton conductor 5 and reach the cathode catalyst layer 7A. In the cathode catalyst layer 7A, the protons and oxygen receive electrons and thus form water by the cathode reaction represented by the following reaction formula (3) in the presence of the electrode catalyst. The cathode reaction is an exothermic reaction. Accordingly, an electromotive force is generated between the anode 6 and the cathode 7.

$$O_2 + 4H^+ + 4e^- \rightarrow 2H_2O \quad (3)$$

The heat generated in the cathode catalyst layer 7A is transmitted to the anode catalyst layer 6A and the anode gas diffusion layer 6B via the proton conductor 5 and via the cathode gas diffusion layer 7B, the second separator 12, and the first separator 9. Accordingly, the anode catalyst layer 6A and the anode gas diffusion layer 6B are maintained between 200° C. and 600° C., so that the dehydrogenation reaction is promoted.

Figure 3:
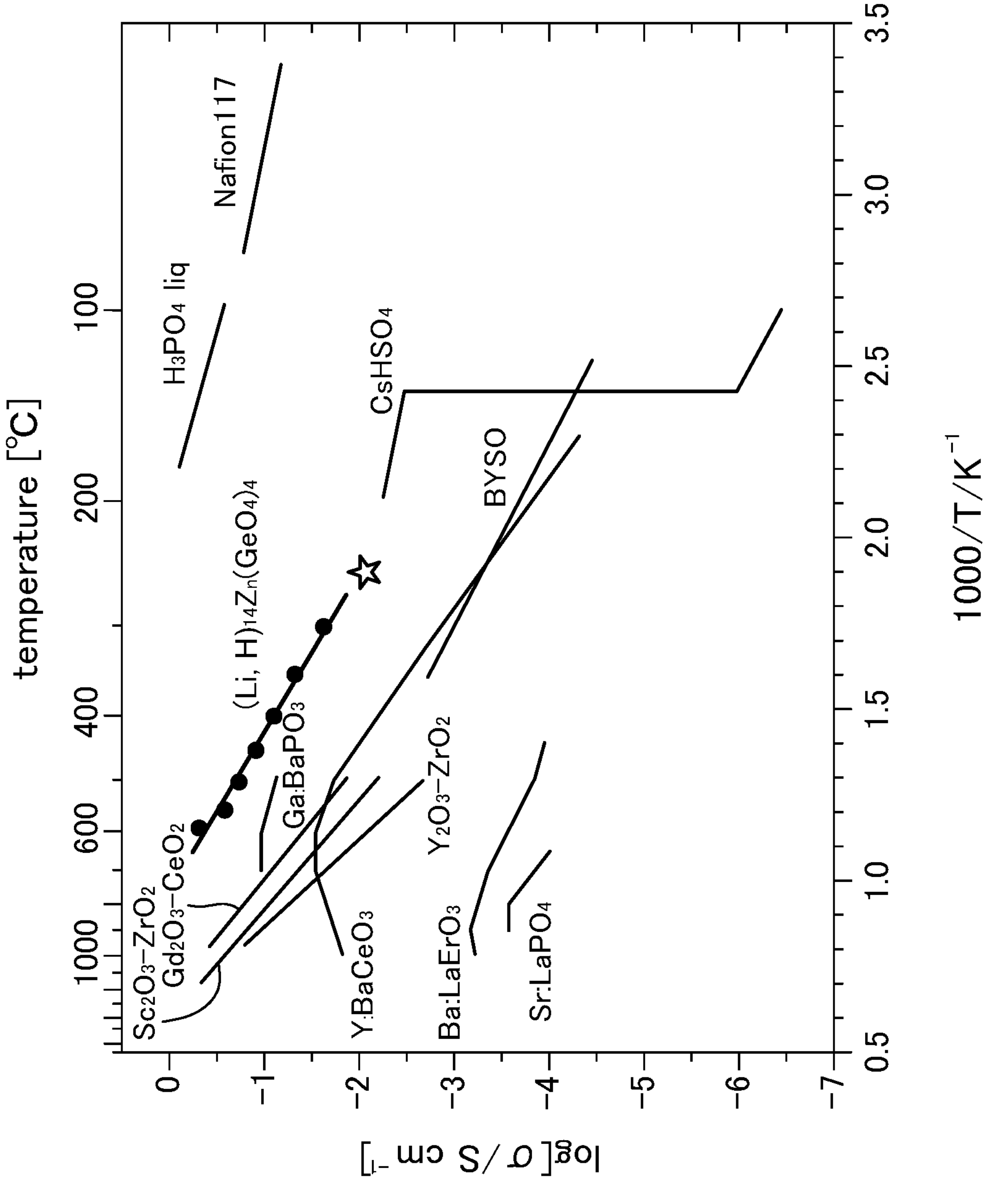
FIG. 3 is a graph showing electric conductivity of solid electrolytes.

In the following, the effects of the fuel cell 1 (electrochemical cell) according to the present embodiment will be described. FIG. 3 is a graph showing electric conductivity of various solid electrolytes. A star in FIG. 3 indicates the electric conductivity σ (0.008 S/cm) (log σ=−2.1) of cesium dihydrogen phosphate ($CsH_2PO_4$) at 250° C. The electric conductivity plotted with circles indicates the electric conductivity of the proton conductor 5 ($(Li, H)_{14}Zn(GeO_4)_4$) according to the present embodiment. The electric conductivity of the proton conductor 5 according to the present embodiment at 300° C. is higher than that of cesium dihydrogen phosphate ($CsH_2PO_4$) at 250° C. Further, the electric conductivity of the proton conductor 5 according to the present embodiment at 600° C. is higher than those of various solid electrolytes used for SOFC.

Further, the electric conductivity of a Nafion™ ion exchange membrane (Nafion™ 117), which is an organic polymer ion exchange membrane used in fuel cells for automobiles, is shown in an upper right side of FIG. 3. The electric conductivity of the proton conductor 5 according to the present embodiment between 500° C. and 600° C. is equivalent to that of the Nafion™ ion exchange membrane at the operation temperature of about 90° C. PEFC using the Nafion™ ion exchange membrane consists of a fuel cell of about 100 kW, and is small. SOFC is much larger than PEFC. When the proton conductor 5 according to the present embodiment is used as the solid electrolyte, the operation temperature of the current SOFC can be lowered and the size thereof can be reduced.

The proton conductor 5 according to the present embodiment has electric conductivity higher than that of cesium dihydrogen phosphate as a solid electrolyte that operates in the temperature range between 200° C. and 250° C. Further, the proton conductor 5 according to the present embodiment has high electric conductivity even in the temperature range between 300° C. and 600° C. The proton conductor 5 according to the present embodiment has electric conductivity equivalent to that of the Nafion™ ion exchange membrane used in the fuel cells for automobiles in a temperature range of 500° C. or higher. Further, the proton conductor 5 according to the present embodiment can be used at a high temperature of 600° C. or higher, and the electric conductivity of the proton conductor 5 according to the present embodiment at 600° C. is equivalent to that of the solid electrolyte used by the existing SOFC at the operation temperature of 600° C. or higher. The proton conductor 5 according to the present embodiment moves not oxide ions but the protons, thereby having high electric conductivity and lowering the operation temperature thereof to about 600° C. Consequently, the proton conductor 5 according to the present embodiment can provide a fuel cell that is more efficient and handier than the existing SOFC.

In a manufacturing method of the proton conductor according to the present embodiment, $Li_{14-2x}Zn_{1+x}(GeO_4)_4$ is immersed and stirred in a non-aqueous organic solution containing acid, so that the ion exchange rate of the movable lithium ions contained in $Li_{14-2x}Zn_{1+x}(GeO_4)_4$ to the protons can be between 40% and 70% inclusive. In a case where the ion exchange rate of the movable lithium ions to the protons is between 40% and 70% inclusive, the structural stability of the proton conductor 5 is improved and the electric conductivity becomes relatively high. By contrast, in a case where $Li_{14-2x}Zn_{1+x}(GeO_4)_4$ is immersed and stirred in an acetic acid aqueous solution, it is confirmed that the ion exchange rate of the movable lithium ions to the protons contained in $Li_{14-2x}Zn_{1+x}(GeO_4)_4$ becomes 100%. However, the proton conductor in this case has low structural stability, a by-product phase is generated when the powder is molded, and it is confirmed that electric conductivity is lowered accordingly. In a case where a non-aqueous solvent is used when the proton conductor is manufactured, the structural stability is improved and thus the electric conductivity is increased even though the ion exchange rate may be lowered as compared with a case where an aqueous solvent is used.

Since the fuel cell 1 uses the proton conductor 5 that has relatively high electric conductivity between 200° C. and 600° C., so that the fuel cell 1 can efficiently generate power. Further, since the dehydrogenation reaction is caused by using the heat generated by the cathode reaction at the cathode 7, energy efficiency can be improved.

In the fuel cell 1, the protons are removed to the opposite electrode by the proton conductor, so that the chemical equilibrium is shifted to a lower temperature. Accordingly, the dehydrogenation reaction of substantially 100% can proceed even at 320° C. or lower. Furthermore, the dehydrogenation reaction can be promoted by increasing the operation temperature.

The inventors of the present application have discovered that the protons can be moved by performing the ion exchange from the lithium ions to the hydrogen ions (protons) in LISICON. Furthermore, the inventors of the present application have discovered that the ion exchange using a non-aqueous solution rather than an aqueous solution results in high electric conductivity. Accordingly, the inventors of the present application have completed the fuel cell 1 (electrochemical cell) according to the embodiment. The proton conductor 5 of the fuel cell 1 according to the present embodiment can improve electric conductivity as compared with the conventional proton conductor. As described above, the proton conductor 5 of the fuel cell 1 according to the present embodiment has remarkably high electric conductivity as compared with 0.008 (S/cm), which is the electric conductivity σ of $CsH_2PO_4$ at the operation temperature of 250° C. $CsH_2PO_4$ has been paid attention as a material having the highest electric conductivity. The proton conductor 5 of the fuel cell 1 according to the present embodiment makes it possible to form a medium-temperature electrochemical cell that operates between 200° C. and 600° C., which has not been put into practical use. Accordingly, the proton conductor 5 can be used for various uses such as an electrolytic cell, in addition to the fuel cell 1.

The fuel cell 1 (electrochemical cell) according to the present embodiment is expected to improve the cell performance by nearly 10 times as compared with the conventional fuel cell using $CsH_2PO_4$ that operates between 200° C. and 600° C. The electrode material containing noble metal, which has been used in the conventional solid electrolyte fuel cell and electrolytic cell, can be used in the temperature range between 200° C. and 600° C., and the reaction speed thereof gets faster as the temperature increases. In a case where the above electrode material is applied to a direct type fuel cell, a decomposition catalyst that generates hydrogen from fuel may be required depending on the type of the fuel. An existing industrial thermochemical catalyst can be used as such a decomposition catalyst, and the reaction speed thereof is sufficiently fast. Accordingly, the performance of the electrochemical cell to which $CsH_2PO_4$ is applied is limited by the conduction speed of the proton, and is considered to be proportional to the electric conductivity of the proton conductor. By applying the proton conductor of the present embodiment, there is a high possibility that the cell performance can be improved by about 10 times.

The Second Embodiment

In the fuel cell according to the first embodiment, the fuel may contain, instead of methylcyclohexane, at least one selected from a group consisting of ammonia, formic acid, methanol, and dimethyl ether. If ammonia is used as the fuel in the fuel cell according to the first embodiment, the dehydrogenation catalyst may be substituted with a known ammonia decomposition catalyst. The ammonia decomposition catalyst is a catalyst that promotes a decomposition reaction that forms hydrogen and nitrogen from ammonia, and may be, for example, a ruthenium-based catalyst, a cobalt-based catalyst, or a nickel-based catalyst. In a case where formic acid is used as the fuel in the fuel cell according to the first embodiment, the dehydrogenation catalyst may be substituted with a known formic acid reforming catalyst. The formic acid reforming catalyst is a catalyst that promotes a reforming reaction to form hydrogen and carbon dioxide from formic acid, and may be, for example, an iridium complex catalyst. In a case where methanol is used as the fuel in the fuel cell according to the first embodiment, the dehydrogenation catalyst may be substituted with a known methanol reforming catalyst. The methanol reforming catalyst is a catalyst that promotes a reforming reaction to form hydrogen and carbon dioxide from methanol and water, and may be, for example, an iridium complex catalyst. When dimethyl ether is used as the fuel in the fuel cell according to the first embodiment, the dehydrogenation catalyst may be substituted with a known dimethyl ether reforming catalyst. Any reaction to form hydrogen from ammonia, formic acid, methanol, or dimethyl ether is an endothermic reaction. Accordingly, the heat generated by the cathode reaction can be used to promote the reaction.

Further, in another embodiment, a hydrogen gas may be supplied to the anode chamber 8 as fuel. In this case, the dehydrogenation catalyst in the anode chamber 8 may be omitted.

The Third Embodiment

Figure 4:
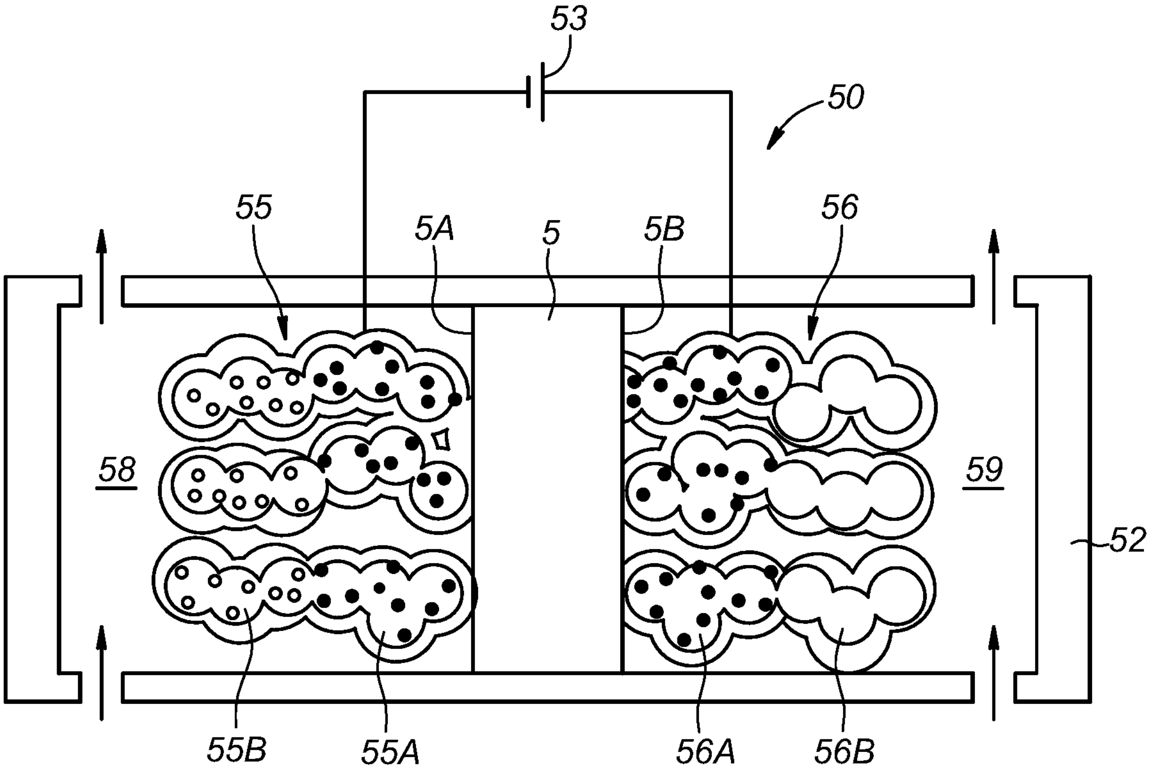
FIG. 4 is a structural diagram of an electrolytic cell.

As shown in FIG. 4, each power generation cell 2 of the fuel cell according to the first embodiment can also be used as an electrolytic cell 50. In this case, the proton conductor 5 functions as an ion exchange membrane, and the first separator 9 and the second separator 12 function as a container 52. An anode 55 is connected to a positive electrode of a DC power supply 53, and a cathode 56 is connected to a negative electrode of the DC power supply 53. Accordingly, a DC voltage is applied between the anode 55 and the cathode 56. The anode 55 and the cathode 56 are electrically insulated from the container 52. An anode chamber 58 and a cathode chamber 59 are separated from each other by the proton conductor 5. A first substance to be oxidized may be supplied to the anode chamber 58, and a second substance to be reduced may be supplied to the cathode chamber 59.

The electrolytic cell 50 may be used for electrolysis in a temperature range between 200° C. and 600° C. inclusive. The electrolytic cell 50 may be used for high temperature steam electrolysis, for example. Water vapor as the first substance may be supplied to the anode chamber 58. Nothing may be supplied to the cathode chamber 59, or water vapor or a purge gas such as nitrogen as the second substance may be supplied to the cathode chamber 59. In the electrolytic cell 50, water molecules deliver electrons to the anode 55, and thus oxygen and the protons are formed at the anode 55 ($2H_2O \rightarrow O_2+4H^++4e^-$). The protons formed at the anode 55 pass through the proton conductor 5, and move to the cathode 56. Then, the protons receive the electrons at the cathode 56, and thus becomes hydrogen molecules ($2H^++2e^- \rightarrow H_2$). Accordingly, an oxygen gas is formed in the anode chamber 58, and a hydrogen gas is formed in the cathode chamber 59.

The electrolytic cell 50 may be used for electrolysis of hydrocarbon or ammonia in a temperature range between 200° C. and 600° C. inclusive. The electrolytic cell 50 may be used, for example, to form hydrogen from hydrocarbon. In this case, a reforming catalyst, instead of the dehydrogenation catalyst, is provided in the anode 55 of the electrolytic cell 50. A hydrocarbon gas and water vapor as the first substance may be supplied to the anode chamber 58. The hydrocarbon may include at least one selected from a group including methylcyclohexane, formic acid, methanol, and dimethyl ether. The hydrocarbon may include lower hydrocarbon such as methane, ethane, propane, and butane. In the electrolytic cell 50, the hydrocarbon and water deliver electrons to the anode 55, and thus the protons and the carbon monoxide are formed at the anode 55. The protons pass through the proton conductor 5, and move to the cathode 56. Then, the protons receive the electrons at the cathode 56, and thus become hydrogen molecules. Accordingly, the carbon monoxide is formed in the anode chamber 58, and the hydrogen molecules are formed in the cathode chamber 59, so that a synthesis gas can be formed by electrolysis of the hydrocarbon gas. Since only hydrogen is formed in the cathode chamber 59, hydrogen of high purity can be formed. The electrolysis may also be performed in a pressurized condition. In this case, the pressure of the gas supplied to the anode chamber 58 and the cathode chamber 59 of the electrolytic cell 50 may be increased.

Furthermore, the electrolytic cell 50 may be used for electrolytic reduction of a carbonic acid gas in a temperature range between 200° C. and 600° C. inclusive. The electrolytic cell 50 may be used, for example, for the electrolytic production of a synthetic gas such as ethylene from carbon dioxide. In this case, a carbon dioxide reduction catalyst, instead of the dehydrogenation catalyst, is provided at the anode 55 of the electrolytic cell 50. The carbon dioxide reduction catalyst contains, for example, at least one of a Group 11 element such as copper, a Group 12 element such as zinc, a Group 13 element such as gallium, a Group 14 element such as germanium, or metal compounds thereof. Water as the first substance may be supplied to the anode chamber 58, and the carbon acid gas as the second substance may be supplied to the cathode chamber 59. In the electrolytic cell 50, carbon dioxide is reduced, and thus ethylene and water are formed at the cathode 56 ($2CO_2+12H^++12e^- \rightarrow C_2H_4+4H_2O$). Water is oxidized, and thus oxygen is formed at the anode 55 ($2H_2O \rightarrow O_2+4H^++4e^-$). Accordingly, oxygen is formed in the anode chamber 58, and ethylene is formed in the cathode chamber 59.

There is a method of using a solid oxide electrolysis cell (SOEC) that electrolyzes water as water vapor at a high temperature of 600° C. or higher by using oxide as a solid electrolyte. This method can reduce the energy given as electric power since a portion of the energy required for electrolysis of water is given as heat, as the theoretical voltage required for electrolysis of water decreases as the temperature increases. However, since the operation temperature becomes a high temperature of 600° C. or higher, it is difficult, like SOFC, to start up and shut down rapidly, and thus the operability is problematic. Further, like SOFC, the cost may become high since the sealing property may be secured at a high temperature of 600° C. or higher, and a material that is stable for a long period at a high temperature of 600° C. or higher may be required. The electrolytic cell 50 according to the present embodiment utilizes, as an ion exchange membrane, the proton conductor 5 that has high electric conductivity in a medium temperature range between 200° C. and 600° C. Accordingly, at a temperature lower than 600° C., the electrolysis with an equivalent current density can be performed.

The electrolytic cell 50 according to the present embodiment can also be applied to a method of electrochemically producing light hydrocarbon such as ethylene and formic acid from carbon dioxide and hydrogen. Conventionally, this method may slow down a reaction speed since a polymer membrane is used as an ion exchange membrane. The electrolytic cell 50 according to the present embodiment operates between 200° C. and 600° C., thereby increasing the current density. Accordingly, a compact electrolytic cell can be realized.

The electrolytic cell 50 according to the present embodiment can be applied to a method of selectively separating, compressing, and pressurizing hydrogen in a gas containing a hydrogen gas. The electrolytic cell 50 according to the present embodiment operates between 200° C. and 600° C., thereby efficiently purifying and compressing hydrogen.

EXAMPLES

Preparing Method of $Li_{14}Zn(GeO_4)_4$

Lithium carbonate was used as the Li source, zinc oxide was used as the Zn source, and germanium oxide was used as the Ge source. Lithium carbonate, zinc oxide, and germanium oxide were added in a weight ratio of 25:4:21, and then slurry was formed as these sources were comminuted and mixed with ethanol and zirconia balls for 24 hours in a sealed container. The slurry was dried at 130° C. to acquire a powder, and the acquired powder was molded into pellets by a press. These pellets were fired in air at 1150° C. for 5 hours in an alumina crucible. Thereafter, the fired pellets were ground in a magnetic mortar for 2 hours, and the ground article was again molded into pellets. Then, the pellets were fired in air at 1150° C. for 5 hours in an alumina crucible. The fired pellets were ground again in a magnet mortar for 2 hours, so that a powder of $Li_{14}Zn(GeO_4)_4$ before ion exchange was acquired.

Example 1

Toluene from which water was removed by a dehydrating agent was used as a non-aqueous solvent, and benzoic acid was dissolved therein at a concentration of 5 mM as a proton source to form a non-aqueous organic solution. A powdery sample of 2.5 g of $Li_{14}Zn(GeO_4)_4$ before ion exchange was stirred in 100 ml of the non-aqueous organic solution for 24 hours to perform ion exchange. After ion exchange, filtration was performed and the powder was collected. The powder was washed with toluene, and then dried in a vacuum condition at 130° C. overnight, so that an ion-exchanged powder of example 1 was acquired. The ion exchange rate of the movable lithium ions to the protons in the proton conductor according to the example 1 was 52%.

Comparative Example 1

A powder of $Li_{14}Zn(GeO_4)_4$ before ion exchange was added to 5 mM of acetic acid aqueous solution having 40 times weight of the powder, and stirred at room temperature for 24 hours to perform ion exchange. After ion change, filtration and washing were performed, and then the filtered and washed article was dried in a vacuum dryer at 130° C. Accordingly, an ion exchanged article of comparative example 1 was acquired. The ion exchange rate of the movable lithium ions to the protons of the proton conductor according to the comparative example 1 was 100%.

Comparison Between Example 1 and Comparative Example 1

The electric conductivity of the ion exchangers of the example 1 and the comparative example 1 was measured. This measurement was performed in a 10% humidified nitrogen atmosphere by a DC four terminal method and an AC two terminal method by using an electrochemical evaluation device (ModuLab by Solartron Analytical). The measurement results thereof are shown in the following Table 1.

TABLE 1

| sample | temperature [° C.] | 300 | 350 | 400 | 450 | 500 | 550 | 600 |
|---|---|---|---|---|---|---|---|---|
| example 1 | electric | $3.53 \times 10^{-2}$ | $6.10 \times 10^{-2}$ | $8.50 \times 10^{-2}$ | $1.22 \times 10^{-1}$ | $1.68 \times 10^{-1}$ | $2.24 \times 10^{-1}$ | $4.07 \times 10^{-1}$ |
| comparative example 1 | conductivity σ [S/cm] | — | — | $2.86 \times 10^{-4}$ | $1.03 \times 10^{-3}$ | $2.55 \times 10^{-3}$ | $5.85 \times 10^{-3}$ | $1.15 \times 10^{-2}$ |

As shown in Table 1, it was confirmed that the example 1 has higher electric conductivity than the comparative example 1.

Example 2

Dimethyl sulfoxide was used as a non-aqueous solvent, and m-nitrophenol, acetic acid, benzoic acid, p-toluenesulfonic acid, oxalic acid, and methanesulfonic acid were used as proton sources. Ion exchange was performed by the same method as in the example 1, while changing the concentration in a range of 5 mM to 100 mM. After that, the amount of ion exchange was measured by thermogravimetric analysis of the powder of $Li_{14}Zn(GeO_4)_4$ where ion exchange was performed. Consequently, the ion exchange rate was 45% to 65% for each proton source.

INDUSTRIAL APPLICABILITY

The fuel cell according to the present embodiment can be used as a direct type fuel cell that utilizes various fuels, in addition to the conventional fuel cell that utilizes hydrogen as fuel. Further, the fuel cell according to the present embodiment can be converted into the electrolysis cell, which utilizes a reaction opposite to the fuel cell. The fuel cell according to the present embodiment can operate between 200° C. and 600° C., thereby improving the speed of the electrochemical reaction as compared with a fuel cell that uses a polymer membrane and operates at 100° C. or less. Further, the fuel cell according to the present embodiment can operate between 200° C. and 600° C., thereby relaxing material restrictions as compared with SOFC that operates at a high temperature of 600° C. or higher. Further, in the fuel cell according to the present embodiment, the protons move, thereby improving the reaction speed as compared with SOFC in which oxygen ions move. As described above, the fuel cell and the electrolytic cell according to the present embodiment have extremely high industrial applicability.

Concrete embodiments of the present invention have been described in the foregoing, but the present invention should not be limited by the foregoing embodiments and various modifications and alterations are possible within the scope of the present invention.

GLOSSARY OF TERMS

1: fuel cell (electrochemical cell)
2: power generation cell (electrochemical cell)
3: fuel cell stack
5: proton conductor
6: anode
6A: anode catalyst layer
6B: anode gas diffusion layer
7: cathode
7A: cathode catalyst layer
7B: cathode gas diffusion layer
8: anode chamber
9: first separator
11: cathode chamber
12: second separator
25: negative electrode
26: positive electrode
41: temperature adjuster
50: electrolytic cell (electrochemical cell)
52: container
53: DC power supply
54: container
55: anode
56: cathode
58: anode chamber
59: cathode chamber

What is claimed is:

1. An electrochemical cell, comprising:

a proton conductor represented by $(Li, H)_{14-2x}Zn_{1+x}(GeO_4)_4$ where a portion of lithium ions of $Li_{14-2x}Zn_{1+x}(GeO_4)_4$ where x is a number equal to or more than 0 is substituted with protons, the proton conductor having electric conductivity of 0.01 S/cm or more at 300° C.;

an anode provided on one side of the proton conductor;

a cathode provided on another side of the proton conductor;

a first separator provided on an anode side of the proton conductor to define an anode chamber; and a second separator provided on a cathode side of the proton conductor to define a cathode chamber.

2. The electrochemical cell according to claim 1, further comprising a temperature adjustor configured to maintain a temperature of the proton conductor between 200° C. and 600° C. inclusive.

3. The electrochemical cell according to claim 1, wherein the x is 0.

4. The electrochemical cell according to claim 1, wherein 40% to 70% inclusive of movable lithium ions contained in $Li_{14-2x}Zn_{1+x}(GeO_4)_4$ are substituted with the protons.

5. The electrochemical cell according to claim 1, wherein 50% to 60% inclusive of movable lithium ions contained in $Li_{14-2x}Zn_{1+x}(GeO_4)_4$ are substituted with the protons.

6. The electrochemical cell according to claim 1, comprising a plurality of cells each including the proton conductor, the anode, the cathode, the first separator, and the second separator, wherein the first separator of one of the plurality of cells is in contact with the second separator of another of the plurality of cells so as to exchange heat.

7. The electrochemical cell according to claim 1, wherein hydrogen is supplied to the anode chamber, air is supplied to the cathode chamber, and an electromotive force is generated between the anode and the cathode, and the electrochemical cell functions as a hydrogen-oxygen fuel cell.

8. The electrochemical cell according to claim 1, wherein a hydrogen-containing compound containing hydrogen is supplied to the anode chamber, air is supplied to the cathode chamber, a catalyst layer containing a catalyst configured to generate a hydrogen gas from the hydrogen-containing compound is provided in the anode chamber, and an electromotive force is generated between the anode and the cathode, and the electrochemical cell functions as a hydrogen-oxygen fuel cell.

9. The electrochemical cell according to claim 8, wherein the hydrogen-containing compound is an organic hydride compound where an aromatic having 1-3 rings is hydrogenated.

10. The electrochemical cell according to claim 8, wherein the hydrogen-containing compound includes at least one selected from a group consisting of methylcyclohexane, cyclohexane, trimethylcyclohexane, decalin, benzyltoluene, and dibenzotriol.

11. The electrochemical cell according to claim 8, wherein the hydrogen-containing compound includes at least one selected from a group consisting of ammonia, formic acid, methanol, and dimethyl ether.

12. The electrochemical cell according to claim 8, wherein the catalyst is a dehydrogenation catalyst including an alumina carrier and platinum carried by the alumina carrier, and an average particle diameter of the platinum is 2 nm or less.

13. The electrochemical cell according to claim 1, wherein water vapor is supplied to the anode chamber, a DC power supply is connected between the anode and the cathode, and the electrochemical cell functions as an electrolytic cell to form hydrogen at the cathode.

14. A power generation method using the electrochemical cell according to claim 1, comprising:

supplying hydrogen to the anode chamber;

supplying air to the cathode chamber; and maintaining a temperature of the proton conductor between 200° C. and 600° C. inclusive.

15. A power generation method using the electrochemical cell according to claim 1, comprising:

providing a catalyst layer in the anode chamber, the catalyst layer being configured to generate a hydrogen gas from a hydrogen-containing compound;

supplying the hydrogen-containing compound to the anode chamber;

supplying air to the cathode chamber; and maintaining a temperature of the proton conductor between 200° C. and 600° C. inclusive.

16. The power generation method according to claim 15, wherein the hydrogen-containing compound is an organic hydride compound where an aromatic having 1-3 rings is hydrogenated.

17. The power generation method according to claim 15, wherein the hydrogen-containing compound includes at least one selected from a group consisting of methylcyclohexane, cyclohexane, trimethylcyclohexane, decalin, benzyltoluene, and dibenzotriol.

18. The power generation method according to claim 15, wherein the hydrogen-containing compound includes at least one selected from a group consisting of ammonia, formic acid, methanol, and dimethyl ether.

19. The power generation method according to claim 15, wherein the catalyst layer includes a dehydrogenation catalyst including an alumina carrier and platinum carried by the alumina carrier, and an average particle diameter of the platinum is 2 nm or less.

20. A manufacturing method of a hydrogen gas by electrolysis using the electrochemical cell according to claim 1, comprising:

supplying water vapor to the anode chamber;

maintaining a temperature of the proton conductor between 200° C. and 600° C. inclusive; and applying a DC voltage between the anode and the cathode and generating a hydrogen gas at the cathode.

21. A manufacturing method of a hydrogen gas by electrolysis using the electrochemical cell according to claim 1, comprising:

providing a catalyst in the anode chamber;

supplying the anode chamber with ammonia or at least one hydrocarbon selected from a group including methylcyclohexane, formic acid, methanol, and dimethyl ether;

maintaining a temperature of the proton conductor between 200° C. and 600° C. inclusive;

applying a DC voltage between the anode and the cathode; and generating the protons from the ammonia or the hydrocarbon by the catalyst in the anode chamber, moving the protons to the cathode through the proton conductor, and generating a hydrogen gas at the cathode.

22. A manufacturing method of a hydrogen gas by electrolysis using the electrochemical cell according to claim 1, comprising:

performing the electrolysis in a pressurized condition.

* * * * *